(12) United States Patent
Beresnev et al.

(10) Patent No.: US 7,967,456 B2
(45) Date of Patent: Jun. 28, 2011

(54) SCALABLE SIZE DEFORMABLE POCKET MIRROR WITH ON-POCKET BIMORPH ACTUATOR

(75) Inventors: Leonid Alexseevich Beresnev, Columbia, MD (US); Mikhail Alexseevich Vorontsov, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 342 days.

(21) Appl. No.: 12/263,016

(22) Filed: Oct. 31, 2008

(65) Prior Publication Data
US 2010/0027142 A1   Feb. 4, 2010

Related U.S. Application Data

(60) Provisional application No. 60/984,799, filed on Nov. 2, 2007.

(51) Int. Cl.
*G02B 5/08* (2006.01)
(52) U.S. Cl. ........................................................ 359/846
(58) Field of Classification Search .................. 359/846, 359/849, 291–295, 298
See application file for complete search history.

(56) References Cited

U.S. PATENT DOCUMENTS

| | | | |
|---|---|---|---|
| 3,299,368 A | 1/1967 | Klebba | |
| 4,128,309 A | 12/1978 | Lehureau | |
| 4,257,686 A | 3/1981 | Albertinetti | |
| 4,420,222 A | 12/1983 | Bret | |
| 5,210,653 A | 5/1993 | Schell | |
| 5,751,503 A | 5/1998 | Blackmon | |
| 5,804,907 A | 9/1998 | Park | |
| 6,464,364 B2 | 10/2002 | Graves | |
| 6,902,281 B2 | 6/2005 | Bennett | |
| 6,989,922 B2 | 1/2006 | Phillips | |
| 2005/0046976 A1* | 3/2005 | Ealey | 359/846 |
| 2005/0200984 A1* | 9/2005 | Browne et al. | 359/846 |
| 2006/0158753 A1* | 7/2006 | Ealey | 359/849 |
| 2006/0285192 A1* | 12/2006 | Yang | 359/291 |
| 2007/0091481 A1* | 4/2007 | Chouji et al. | 359/846 |

OTHER PUBLICATIONS

T. Weyrauch, M. A. Vorontsov, L. A. Beresnev, and Ling Liu, "Atmospheric compensation over a 2.3 km propagation path with a multi-conjugate (piston-MEMS/modal DM) adaptive system", Proc. SPIE, vol. 5552, pp. 73-84 (2004).
S. A. Kokorowski, J. Opt. Soc.Am. 69, 181 (1979).
M. A. Vorontsov, A. V. Kudryashov, S. I. Nazarkin, and V. I. Shmalhausen, "Flexible mirror for adaptive light-beam formation system", Sov. J. Quantum Electron. 14(6), pp. 839-841 (1984).
J. W. Hardy, "Active Optics: A New Technology for the Control of Light", Proc. IEEE, vol. 66, No. 6, pp. 651-697, Jun. 1978. M. A. Ealey "Actuators: Design Fundamentals, Key Performance Specification, and Parametric Trades", SPIE vol. 1543, Active and Adaptive Optical Components, 1991, pp. 346-362.
M. A. Ealey and J. A. Wellman, "Deformable Mirrors: Design Fundamentals, Key Performance Specifications and Parametric Trades", SPIE vol. 1543, Active and Adaptive Optical Components, 1991, pp. 36-51.

* cited by examiner

*Primary Examiner* — Stephone B Allen
*Assistant Examiner* — Kimberly N Kakelec
(74) *Attorney, Agent, or Firm* — Guy M. Miller; Alan I. Kalb

(57) ABSTRACT

The invention includes a deformable mirror for use in adaptive and active optical systems and in optical technology laser communication directed energy systems. The invention utilizes pockets formed in the back of the mirrors substrate. The pockets house actuators that are bonded to the substrate and may adjustably deform the mirror surface depending on the voltage supplied to the actuators. A plurality of mirrors may be combined to form a scalable array or positioned to overcome issues related to the uncontrollable portions of separate individual mirrors.

8 Claims, 5 Drawing Sheets

SCALABLE SIZE DEFORMABLE POCKET MIRROR WITH ON-POCKET BIMORPH ACTUATOR

This application claims priority benefits of prior U.S. provisional application entitled "Scalable-Size Deformable Pocket Mirror With On-Pocket Bimorph Actuators", Ser. No. 60/984,799 filed on Nov. 2, 2007.

The invention described herein may be manufactured, used, and licensed by or for the United States government.

BACKGROUND

The present invention relates to a deformable mirror. More particularly, the present invention relates to deformable mirrors for use in adaptive and active optical systems for use in optical technology laser communication directed energy systems.

Adaptive and active optical elements are designed to improve optical system performance in the presence of phase aberrations. An ideal deformable mirror should have sufficient frequency bandwidth for compensation of fast changing wave front aberrations induced by either atmospheric turbulences or by turbulent air flows surrounding flying objects. Applications such as atmospheric target tracking, remote sensing from flying aircraft, boundary layer imaging, laser communication and laser beam projection over near horizontal propagation paths a phase aberration frequency bandwidth can exceed several kHz. Compensating for fast changes has typically been done using small deformable mirrors. These mirrors are usually a few inches or less in overall size. An example of such a mirror is the micro-electro-mechanical systems (MEMS) based deformable mirrors, other examples include piezoelectric deformable mirrors based on semi-active or passive bimorph elements (also commonly referred to as bimorph mirrors), or deformable mirrors with an array of push-pull type actuators are also well known in the art.

All of the aforementioned deformable mirror systems and devices suffer from scalability problems. These mirror systems are all difficult or impractical to scale up to a larger size without either significant reduction of their operational speed or substantial increase of optical system complexity. Increases in complexity usually translate into additional costs and physically larger devices. Complexity and size are two common issues that are encountered when attempting to scale up deformable mirrors by aggregating or combining a plurality of small deformable mirrors into one large phased array.

The problems outlined above are more clearly understood from the following discussion. To match the small size of a deformable mirror whose diameter is "d", the optical telescope aperture where diameter D>>d, must be re-imaged with a demagnification factor M=D/d. Additionally, in most practical applications the demagnification factor M can be extremely large (on the order of 100 or even more). Hence, re-imaging of the telescope pupil with a high magnification factor requires installation of additional optical elements including one or more optical relay systems. This results in a substantial increase of complexity, size, weight, and cost of the entire optical device or system. The high magnification factor introduces others problems including that of additional vibration and higher temperature. Generally, deformable mirror systems alone are highly sensitive to vibrations and high-thermal gradient environmental factors, adding additional complexity to these devices tends to have an adverse effect them.

Clearly there is a need in the art for a deformable mirror that is scalable, able to perform many deformation cycles at high rate of speed, and is not overly complex. We believe that the present invention addresses these needs.

SUMMARY

The present invention overcomes all of the aforementioned issues previously described that presently exist in the art. One of the advantages of the present invention over existing deformable mirror devices and systems is that the present invention offers a deformable mirror design that can be significantly scaled up. The deformable mirror of the present invention can be easily scalable up to a size suitable for use as an optical telescope primary mirror.

The present invention includes a pocket deformable mirror that can be used directly as the primary adaptive mirror of an optical telescope or as a laser beam delivery system. This unique dynamic functionality eliminates the need for additional optical elements that would be required with other deformable mirror systems. Without the present invention, many additional elements would have to be incorporated into the telescope optical train or the laser beam delivery system.

A deformable mirror is created by disposing a reflective coating on one side of a substrate and forming an array of pockets on the other side of the substrate. An electro actuator is mounted inside each of the pockets and coupled to a voltage source. The application of voltage to the actuator causes the actuator move and with it the substrate. As the substrate moves, the mirror deforms. The substrate may be made of glass or a composite material. The mirror coating is a light reflecting layer that is formed from a dielectric or metal that is applied to one surface of the substrate. The reflecting layer is applied to the substrates surface through the deposition process.

The thickness of the substrate inside the pocket area is significantly less (a few mm or less) than that of the area outside of the pocket. A thin layer of an electro-active material such as piezo-ceramic material is bonded to the bottom surface of each pocket. A set of patterned conductive films, commonly known as pixels, are deposited on both sides of the electro-active material.

These and other features, aspects, and advantages of the present invention will become better understood with reference to the following description and appended claims.

BRIEF DESCRIPTION OF THE DRAWINGS

A more complete appreciation of the invention will be readily obtained by reference to the following Detailed Description and the accompanying drawings in which like numerals in different figures represent the same structures or elements. The representations in each of the figures are diagrammatic and no attempt is made to indicate actual scales or precise ratios. Proportional relationships are shown as approximates.

FIG. 3A is a side sectional view through the center of a substrate in accordance with the present invention while

DETAILED DESCRIPTION

Having briefly described the present invention, the following examples are given to illustrate specific applications of the present invention including the best mode now known to perform the present invention. These specific examples are not intended to limit the scope of the invention described in this application.

Figure 1A:
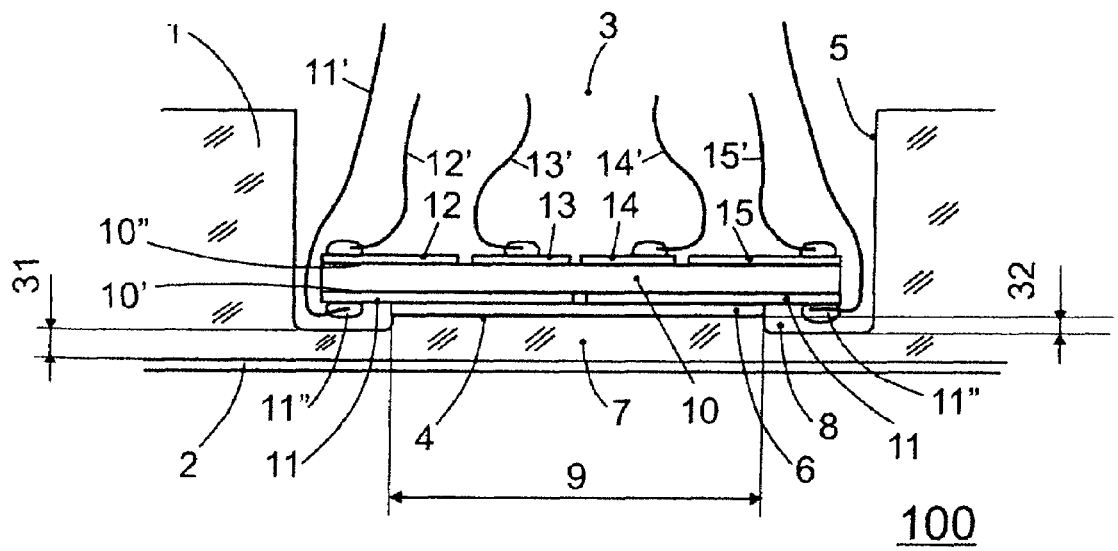
FIGS. 1A, 1B and 1C depict a cross sectional representation of a single pocket formed in a substrate in accordance with the present invention and shown through various stages of operation.
Figure 1B:
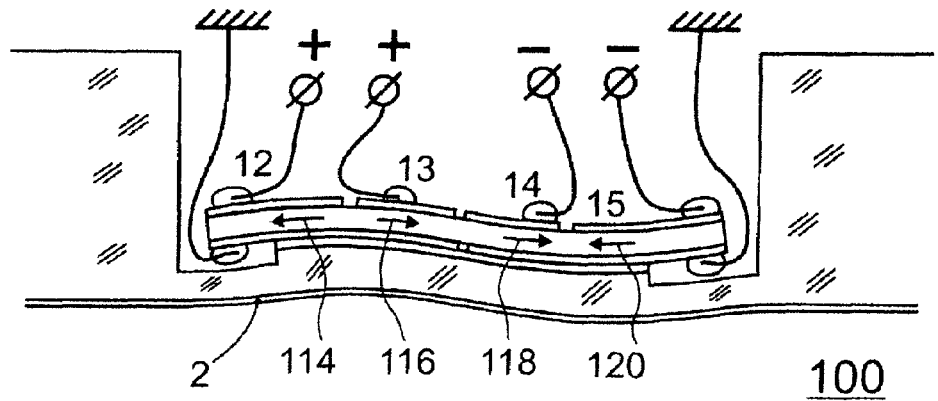
Figure 1C:
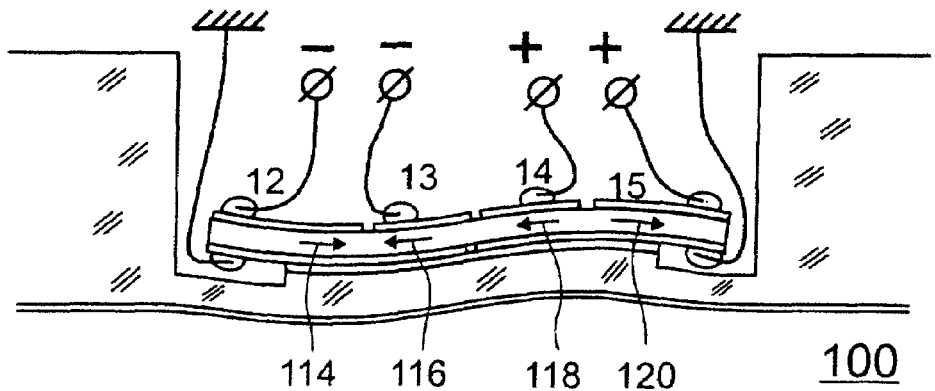

It may be advantageous for the reader to refer to FIGS. 1A, 1B and 1C simultaneously to more filly understand various aspects of the present invention. The FIGS. 1A, 1B and 1C depict a cross sectional view of a single pocket 3 formed in a substrate 1 in accordance with the present invention 100 and shown through various stages of operation. The substrate 1 may be formed from the following materials including but not limited to: glass and/or graphite filled cyanate ester composite. One side of the substrate 1, which we shall hereinafter refer to as the bottom 4, is coated with a reflective coating 2. The reflective layer 2 provides a mirror like surface to the bottom 4 of the substrate 1. The mirror effect is achieved through the process of deposition and the coating 2 may be a metal or dielectric material.

The non-mirrored side, which we shall hereinafter refer to as the top, has a pocket 3, with bottom surface 4, an annular ring 8 which forms the table 7, and walls 5. An electro-active thin-sheet actuator 10 is bonded to the surface 4 of the table 7 by means of adhesive layer 6. A set of conductive films 11, 12, 13, 14 and 15 are deposited on both sides of the actuator 10.

The conductive films 11, 12, 13, 14 and 15 on both sides of the actuator 10 may be fabricated by using a lithography process such as that commonly used to apply nickel, gold or silver films as is known in the art.

FIG. 1B and FIG. 1C depict the resulting deformation of the bottom surface 2 as various forces are applied to the substrate 1 by the actuator 10 during a deformation cycle. The forces and resulting deformations are represented by arrows 114, 116, 118 and 120 respectively. The orientation of the arrows shows the direction of forces. The contraction or expansion of the selected areas by the actuator 10 is induced though an external voltage that is applied to the wires 11', 12', 13', 14' and 15' and to the corresponding areas of the actuator 10. Due to semi-passive nature of the bimorph structure formed by the electro-active layer 10 and table 7 the bottom reflective surface 2 elastically deforms in response to contraction or to expansion of the actuator 10.

The selected deformation of the bottom reflective surface 2 is apparent when FIGS. 1B is and 1C are compared to FIG. 1A. For example referring specifically to FIG. 1B, as positive voltage applied to one side of areas 12 and 13 and negative voltage applied to areas 14 and 15 relative to grounded electrodes 11 which are deposited on opposite side of the actuator 10.

By changing the polarity of these voltages, the elastic deformation that is induced is reversed and the shape of the elastic deformation of the selected areas 12, 13, 14, 15 is changed. The shape and number of conductive areas on an actuator 10 can be flexibly configured so as to provide an array of various and sundry contour shapes and patterns.

As an example, a deformable pocket mirror in accordance with the teachings of the present invention 100 was fabricated from a bulk glass substrate having a thickness of 20 mm and pocket depth 18 mm. This specific example of one embodiment of the invention had a table thickness 7 of approximately 2 mm.

The pocket 3 was fabricated with the following dimensions and parameters formulated in Table 1:

TABLE 1

Figure 2:
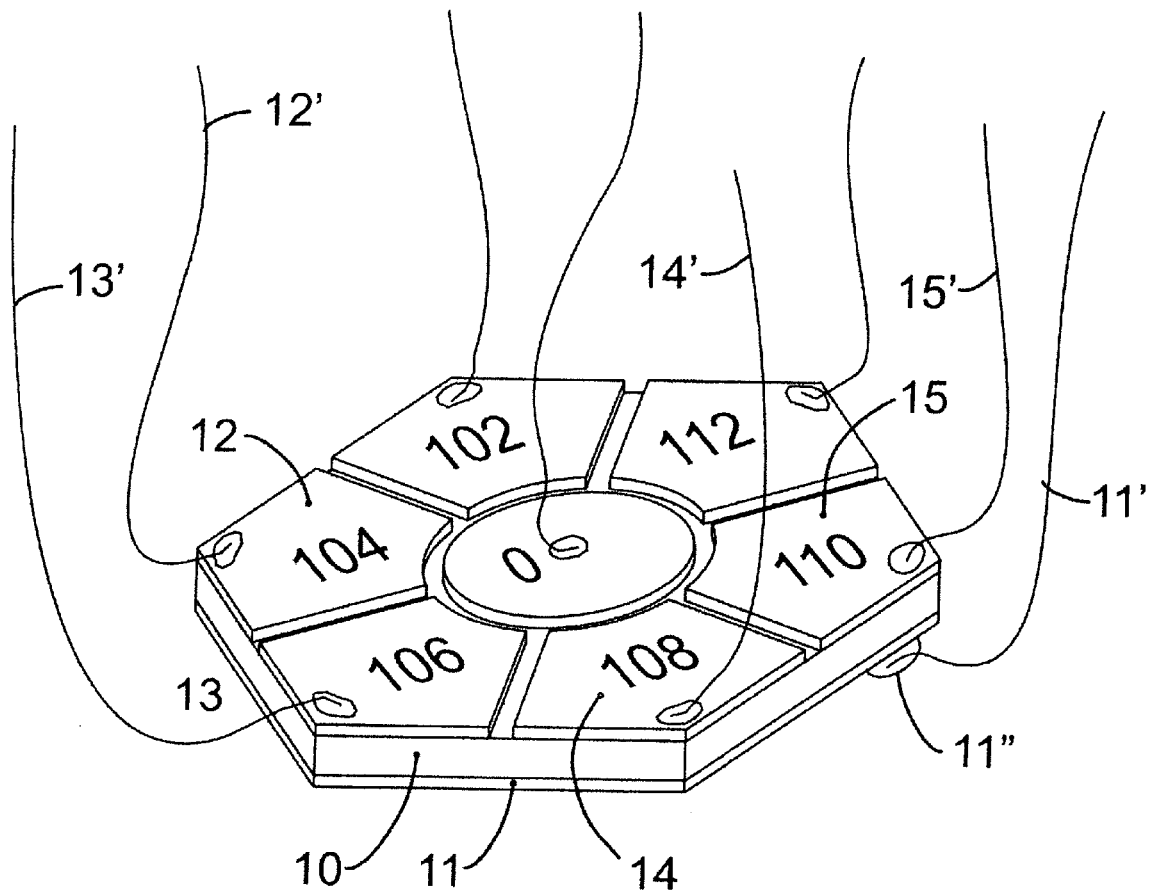
FIG. 2 is a perspective view depicting a single electro-active actuator in accordance with one embodiment of the present invention.

Parameters of the one-pocket deformable mirror:

| | |
|---|---|
| Material of mirror: | borofloat glass |
| Shape of the pocket: | hexagon |
| Thickness of active area (table): | 2.0 mm |
| Width of pocket: | 29 mm |
| Table diameter: | 25 mm |
| Electro-active material: | piezoelectric ceramic 5H |
| Thickness of piezoelectric ceramic: | 0.26 mm |
| Number of conductive areas: | 7 on one side of actuator (central area with diameter |
| i. | 12 mm + 6 side pixels), one common grounded |
| ii. | Electrode on opposite side of actuator shown in FIG. 2. |
| Stroke: | +/−2.2 μm for +/−100 V applied to all electrodes |
| Resonance frequency: | 15.3 kHz, focus mode |

The electrical wires 11', 12', 13', 14' and 15' are coupled to the conductive films 11, 12, 13, 14 and 15 in order to provide an electrical voltage to the selected areas of the actuator 10. The electro-active thin-sheet actuator material is polarized so that applied voltages results in the contraction or expansion of the electro-active actuator 10 in the direction orthogonal to the material polarization.

The thickness of the substrate 1 between reflecting surface 2 and bottom surface 4 of the pocket 3 is thin enough to allow flexibility of the table 7 when force is applied by actuator 10.

FIG. 2 is a perspective view depicting a single electro-active actuator in accordance with one embodiment of the present invention. In this drawing the unseen side of the actuator 10 is the side that is bonded to the substrate (not shown). The conductive films 11, 12, 13, 14 and 15 are deposited on both sides of the actuator 10. Connecting wires 11', 12', 13', 14' and 15' are also depicted being coupled to each respective section of the actuator 10. The pixels, formed in segments, are represented as 0, 102, 104, 106, 108, 110, and 112 respectively.

In Table 2 the pocket deformable mirror surface deformation pick values are presented for the corresponding combinations of voltages applied to the selected electrodes or their combinations:

TABLE 2

| No | Voltages applied to a single pocket electrodes | Deformation pick value, μm |
|---|---|---|
| 1 | all electrodes at +30 V | 0.5 |
| 2 | all electrodes at +60 V | 1.2 |
| 3 | all electrodes at +100 V | 2.2 |
| 4 | all electrodes at −100 V | −2.2 |
| 5 | Electrode (1) at +120 V | 0.58 |
| 6 | Electrode (4) at +120 V | 0.66 |
| 7 | Electrode (0) at +120 V | 1.2 |
| 8 | Electrodes (1), (3), (5) at +120 V, electrodes (2), (4), (6) at −120 V | 0.9 |
| 9 | Electrodes (1), (2), (3) at −90 V, electrodes (4), (5), (6) at +90 V | 1.5 |
| 10 | Electrodes (3), (6) at +100 V, electrode (0) at −100 V | 1.2 |
| 11 | Electrodes (2), (4), (6) at +100 V, electrode (0) at −100 V | 1.1 |

Figure 3A:
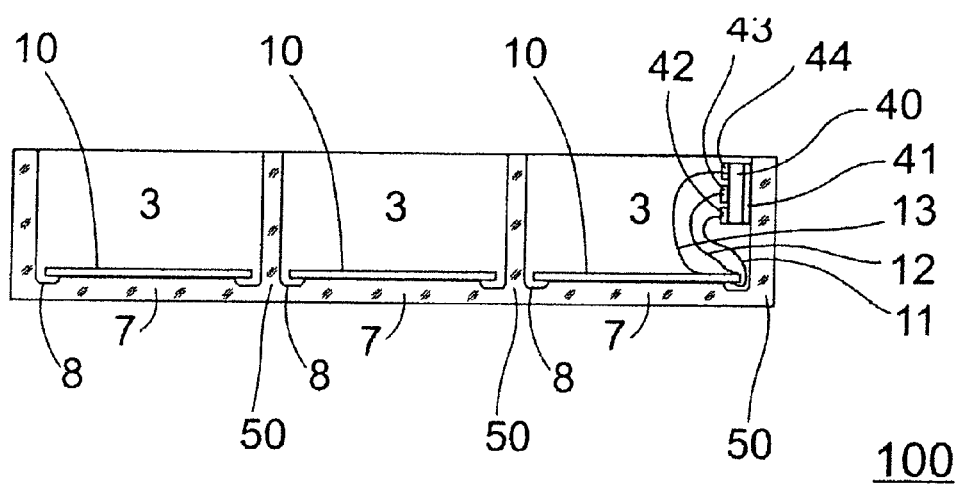
Figure 3B:
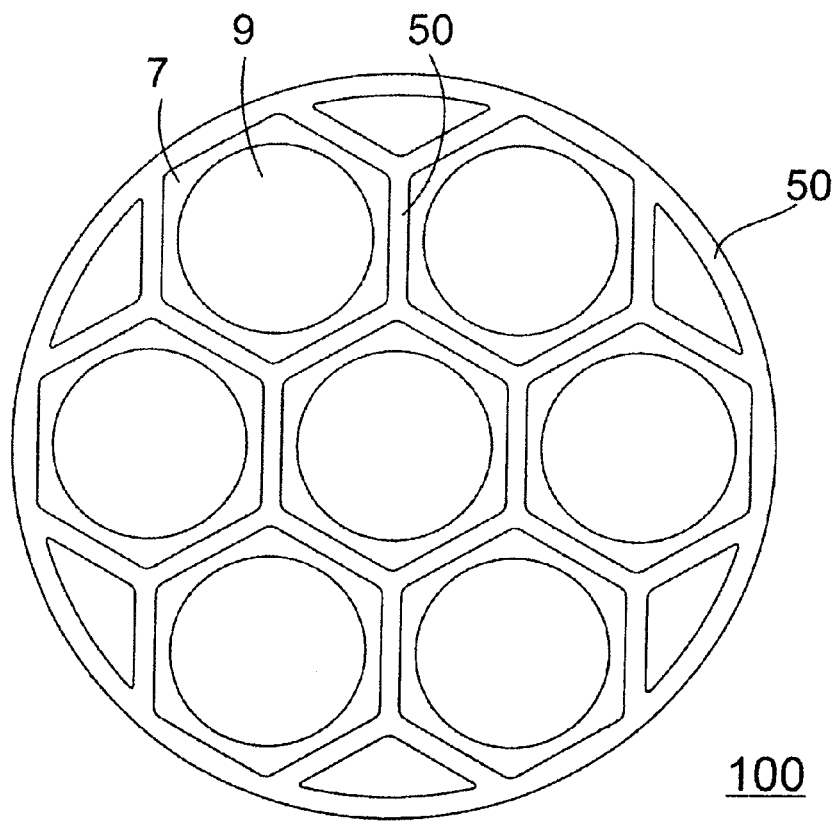
FIG. 3B is a top plan view of the same substrate.

FIG. 3A is a side sectional view through the center of a substrate in accordance with the present invention while FIG. 3B is a top plan view of the same substrate. These figures depict one embodiment of the present invention 100. In this embodiment of the present invention 100, a plurality of actuators 10 are disposed within a large substrate 50 in order to create a large scale deformable mirror. In this example there are 7 hexagonal pockets is depicted. The pocket deformable mirror surface deformation characteristics for each pocket deformable mirrors are presented in Table 1 (previously discussed). The pocket deformable mirror substrate thickness is 20 mm, the thickness of ribs is near 3 mm.

The invention can be applied to a large deformable mirror which can be fabricated by means of scaling the number of the described pockets. The shape of pockets can be arbitrarily chosen e.g. be triangular, rectangular, hexagonal etc. The internal dimensions of the pocket deformable mirror may contain pockets of different shapes. The number of control channels 8 at each pocket depends on the chosen number of conductive films 11 deposited on the actuator 10.

It is yet another aspect of the present invention that of the arrangement of the electro-active actuator inside of pocket. As noted in the previous figures, the annular groove 8 provides mechanical decoupling of the neighboring pockets and allows connection of the electrical wire 11' to the conductive films 11 deposited on actuator surface 10' adjacent to the bottom 4 of the pocket 3. The dimensions of the pockets 3 and grooves 8 are specifically designed to preserve high frequency bandwidth of pocket operation and avoid its through print at the reflective mirror surface 2.

FIG. 3A further depicts the arrangement of the electrical connections this embodiment of the invention 100. The electrical connector 40 is attached to the pocket wall 5 inside of pocket 3. The connector 40 is attached to the pocket wall 5 by a flexible adhesive 41. One such example of a flexible adhesive 41 would be ultra-violet cured glue NOA-60. The adhesive 41 provides the mechanical decoupling of the connector 40 from the rib structure of the substrate 50 of the present invention 100. The flexible electrical wires 11', 12', 13', 14' and 15' connect the pixels 11, 12, 13 14 and 15 of the actuators 10 to the connecting points 42, 43, and 44, of the connector 40. An external voltage is applied to the connecting points 42, 43, and 44, through the standard cables such as flexible circuit boards or multi-wires flat ribbon cables. These cables can be soldered to the connecting points or a standard type connector may be employed.

Figure 4:
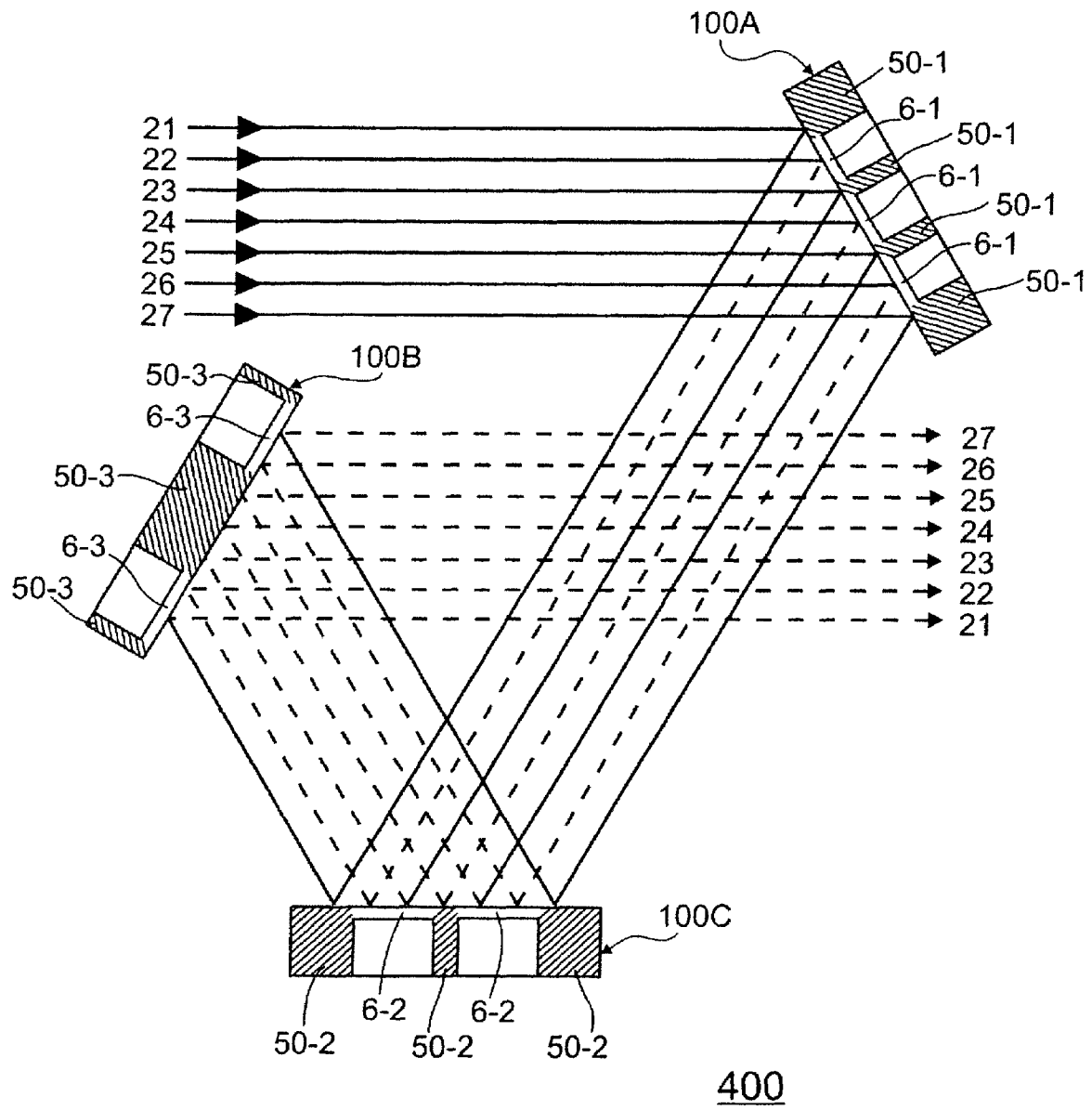
FIG. 4 is a plan view depicting an arrangement of deformable pocket mirrors in accordance with the teachings of the present invention; and, FIG. 5 is a diagram depicting the arrangement of another system for employing a plurality of deformable pocket mirrors in accordance with the teachings of the present invention.

FIG. 4 addresses the issue of non-controllable area of the pocket deformable mirror. FIG. 4 is a plan view depicting an arrangement 400 of deformable pocket mirrors 100A, 100B, and 100C respectively, in accordance with the teachings of the present invention. These non-controllable areas correspond to the rib structure within the substrate of the mirror. FIG. 4 depicts the combination 400 of three pocket mirrors 100A, 100B and 100C respectively having the overlapping control areas.

A set of lines and arrows labeled 21 through 27 in FIG. 4 are shown to depict communication carrying laser beams for the purpose of the foregoing discussion. All beams 21, 22, 23, 24, 25, 26 and 27 of the incoming wave front have a controllable phase after they are reflected from these three mirrors. Mirror 100A controls the phase of beams 22, 24, 26 using pockets 6-1. Beams 21, 23, 25, 27 are reflected from areas with rib structure and hence their phase is not controlled by mirror 100A. Mirror 100B controls the phase of beams 23 and 25. Finally the mirror 100C controls the phase of the remaining beams 21 and 27.

Figure 5:
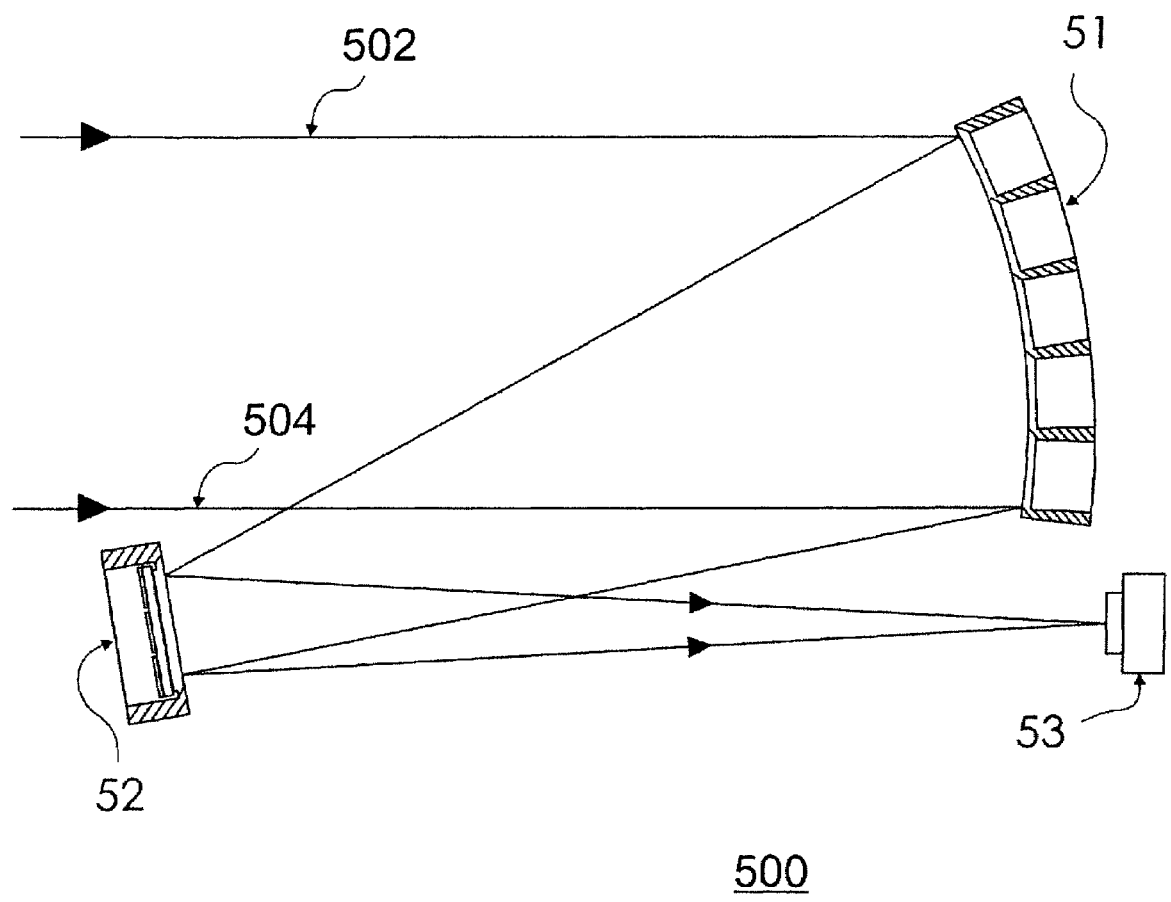

Finally in FIG. 5 we see the present invention deployed in a telescope configuration 500. FIG. 5 is a diagram depicting the arrangement of another system for employing a plurality of deformable pocket mirrors in accordance with the teachings of the present invention.

In this embodiment two types of pocket deformable mirrors both in accordance with the teachings of this invention, are being used. First, a primary mirror 51, and then a single pocket deformable mirror 52 is employed as the telescopes secondary mirror. The primary mirror 51 controls the high order aberrations whereas the secondary mirror 52 controls the low-order aberrations. Image waves 502 and 504 respectively coming into the telescope are corrected before they reach the imaging camera 53. Once corrected, the images are focused on imaging camera 53.

Although the present invention has been described in considerable detail with reference to certain embodiments and versions thereof, other versions are possible. Therefore, the spirit and scope of the appended claims should not be limited to the description of the embodiments or versions contained herein.

What is claimed is:

1. A deformable mirror comprising:
  (a) a substrate having a top and a bottom sides and a thickness;
  (b) a reflective coating disposed on one of said sides of said substrate;
  (c) at least one recess formed in one of said sides of said substrate;
  (d) at least one actuator in communication with said substrate,
  (e) at least one electrical connector in communication with said actuator;
  (f) an annular groove disposed at the bottom of said recess and
  (g) a raised circular table within said recess and being formed by said groove, said table being concentrically located about the center of said recess and parallel to said reflecting surface of said substrate; and
  (h) said actuator is affixed to said table and said actuator is mechanically isolated from all other areas of the recess whereby said actuator transmits motion exclusively through said table to said reflecting surface of said substrate.

2. The deformable mirror according to claim 1, wherein said reflecting coating is disposed on said top side of said substrate.

3. The deformable mirror according to claim 1, wherein said actuator is disposed in said recess.

4. The deformable mirror according to claim 1, wherein said recess is formed through more than half of said thickness of said substrate.

5. The deformable mirror according to claim 1, wherein said actuator is in communication with said top side of said connector.

6. The deformable mirror according to claim 1, wherein said substrate is formed of ceramic material.

7. The deformable mirror according to claim 6, wherein the ceramic substrate is glass.

8. The deformable mirror in accordance with claim 1 wherein said recesses further comprise a bottom and at least one wall.

* * * * *